United States Patent
Tanigawa et al.

(10) Patent No.: US 9,808,894 B2
(45) Date of Patent: Nov. 7, 2017

(54) SWASH PLATE OF A SWASH PLATE TYPE COMPRESSOR AND THE SWASH PLATE TYPE COMPRESSOR

(71) Applicants: Naonari Tanigawa, Toin-cho (JP); Yoshio Oki, Toin-cho (JP)

(72) Inventors: Naonari Tanigawa, Toin-cho (JP); Yoshio Oki, Toin-cho (JP)

(73) Assignee: NTN Corporation, Osaka (JP)

( * ) Notice: Subject to any disclaimer, the term of this patent is extended or adjusted under 35 U.S.C. 154(b) by 261 days.

(21) Appl. No.: 14/251,700

(22) Filed: Apr. 14, 2014

(65) Prior Publication Data

US 2014/0215821 A1 Aug. 7, 2014

Related U.S. Application Data

(62) Division of application No. 12/866,900, filed as application No. PCT/JP2009/053666 on Feb. 27, 2009, now abandoned.

(30) Foreign Application Priority Data

Mar. 3, 2008 (JP) .................................. 2008-052172

(51) Int. Cl.
   *B23P 15/00* (2006.01)
   *B05D 5/08* (2006.01)
   (Continued)

(52) U.S. Cl.
   CPC .............. *B23P 15/00* (2013.01); *B05D 5/083* (2013.01); *F04B 27/1054* (2013.01);
   (Continued)

(58) Field of Classification Search
   CPC .... B29C 33/56; Y10T 29/49236; F04B 1/146; F01B 3/02; B05D 5/083; B05D 2202/10;
   (Continued)

(56) References Cited

U.S. PATENT DOCUMENTS

| 4,146,401 A | 3/1979 | Yamada et al. |
| 5,737,956 A | 4/1998 | Takahashi et al. |

(Continued)

FOREIGN PATENT DOCUMENTS

| CN | 2218050 Y * | 1/1996 |
| CN | 100418877 | 9/2008 |

(Continued)

OTHER PUBLICATIONS

Abstract for CN2218050Y, Liu, "Finisher with adjustable central distance of grinding heads", 1996.*

(Continued)

*Primary Examiner* — Devon Kramer
*Assistant Examiner* — Lilya Pekarskaya
(74) *Attorney, Agent, or Firm* — Wenderoth, Lind & Ponack, L.L.P.

(57) ABSTRACT

A swash plate fulfils the basic properties required for a swash plate, which are stable boundary lubricating state by lubricating oil, without forming a metal spray coating layer comprising a copper type or aluminum type material on the surface of a substrate 3a forming the swash plate 3 of the swash plate type compressor as an intermediate layer. The substrate 3a of the swash plate 3 comprises a disk-shaped steel sheet formed by pressing a rolled steel sheet into a disk shape, and both surfaces of the disk-shaped steel sheet are ground. Thus, resin coating layers 10 containing fluororesin, which has superior seizure resistance, can be strongly fixed to the substrate without the need to form a metal spray coating layer on the surface of the substrate. This improves the durability of the swash plate type compressor using carbon dioxide gas as a refrigerant.

5 Claims, 2 Drawing Sheets

(51) Int. Cl.
*F04B 27/10* (2006.01)
*F01B 3/02* (2006.01)
*F04B 1/14* (2006.01)

(52) U.S. Cl.
CPC ............ *B05D 2350/38* (2013.01); *F01B 3/02* (2013.01); *F04B 1/146* (2013.01); *F05C 2225/00* (2013.01); *F05C 2253/12* (2013.01); *F05C 2253/20* (2013.01); *Y10T 29/49236* (2015.01); *Y10T 74/18336* (2015.01)

(58) Field of Classification Search
CPC ............ B05D 2350/38; B05D 2505/00; B05D 2506/15; B05D 2601/20; B05D 2602/00; B05D 2401/10; B05D 3/02
USPC ................................................ 417/269, 271
See application file for complete search history.

(56) References Cited

U.S. PATENT DOCUMENTS

| | | | |
|---|---|---|---|
| 5,871,337 | A | 2/1999 | Fukanuma et al. |
| 6,123,009 | A * | 9/2000 | Kanayama et al. ............. 92/71 |
| 6,192,784 | B1 * | 2/2001 | Kato ....................... C23C 30/00 92/155 |
| 6,568,918 | B2 | 5/2003 | Sugioka et al. |
| 6,694,864 | B2 * | 2/2004 | Kato ................... F04B 27/1054 228/115 |
| 6,752,065 | B2 | 6/2004 | Sugioka et al. |
| 6,921,205 | B2 * | 7/2005 | Kanayama et al. ............ 384/13 |
| 7,241,722 | B2 * | 7/2007 | Murase et al. ................ 508/106 |
| 7,862,307 | B2 | 1/2011 | Watanabe et al. |
| 2003/0000379 | A1 * | 1/2003 | Sugiura et al. .................... 92/71 |
| 2003/0005821 | A1 * | 1/2003 | Ota et al. ......................... 92/70 |
| 2005/0139064 | A1 | 6/2005 | Hakamata et al. |
| 2005/0257684 | A1 | 11/2005 | Sugiura et al. |
| 2005/0284203 | A1 * | 12/2005 | Takekoshi et al. .............. 72/204 |
| 2006/0144118 | A1 * | 7/2006 | Nakata .................. B21D 53/26 72/335 |
| 2007/0021041 | A1 * | 1/2007 | Muranishi .............. B24B 53/02 451/56 |
| 2007/0269674 | A1 * | 11/2007 | Yanase et al. ................ 428/550 |
| 2008/0248269 | A1 | 10/2008 | Shibuya et al. |
| 2010/0167628 | A1 * | 7/2010 | Himmelsbach et al. ......... 451/5 |
| 2011/0195635 | A1 * | 8/2011 | Himmelsbach .................. 451/5 |

FOREIGN PATENT DOCUMENTS

| | | |
|---|---|---|
| EP | 1310674 | 5/2003 |
| JP | 62-251078 | 10/1987 |
| JP | 6-329872 | 11/1994 |
| JP | 7-003149 | 1/1995 |
| JP | 8-199327 | 8/1996 |
| JP | 10-205437 | 8/1998 |
| JP | 2000-079422 | 3/2000 |
| JP | 2002/089437 | 3/2002 |
| JP | 2002-210640 | 7/2002 |
| JP | 2002-349428 | 12/2002 |
| JP | 2003-138287 | 5/2003 |
| JP | 2006-007253 | 1/2006 |
| JP | 2006-008994 | 1/2006 |
| JP | 2006-045493 | 2/2006 |
| JP | 2007-169426 | 7/2007 |
| WO | 02/075172 | 9/2002 |
| WO | 2009/100771 | 8/2009 |

OTHER PUBLICATIONS

International Search Report issued Mar. 31, 2009 in International (PCT) Application No. PCT/JP2009/053666.
Notice of Reasons for Rejection issued Nov. 13, 2012 in JP 2008-052172 which is a foreign counterpart to the present application (with partial English translation).
Office Action dated Sep. 1, 2017 in German Application No. 11 2009 000 434.2, with English translation.

* cited by examiner

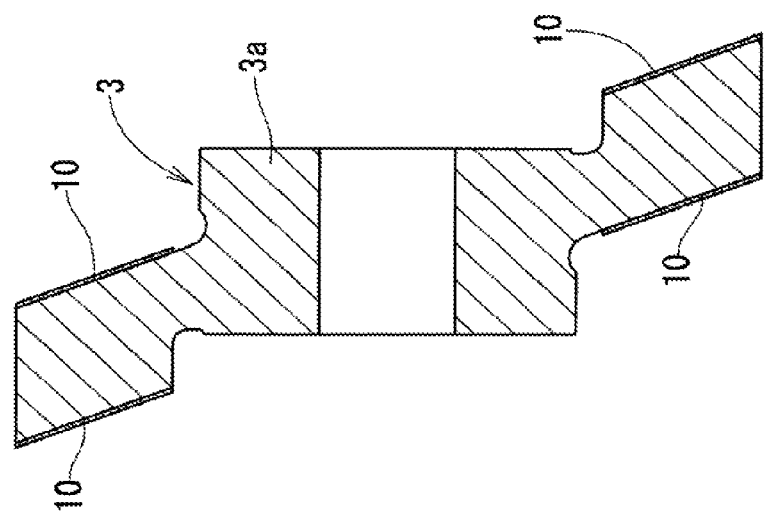
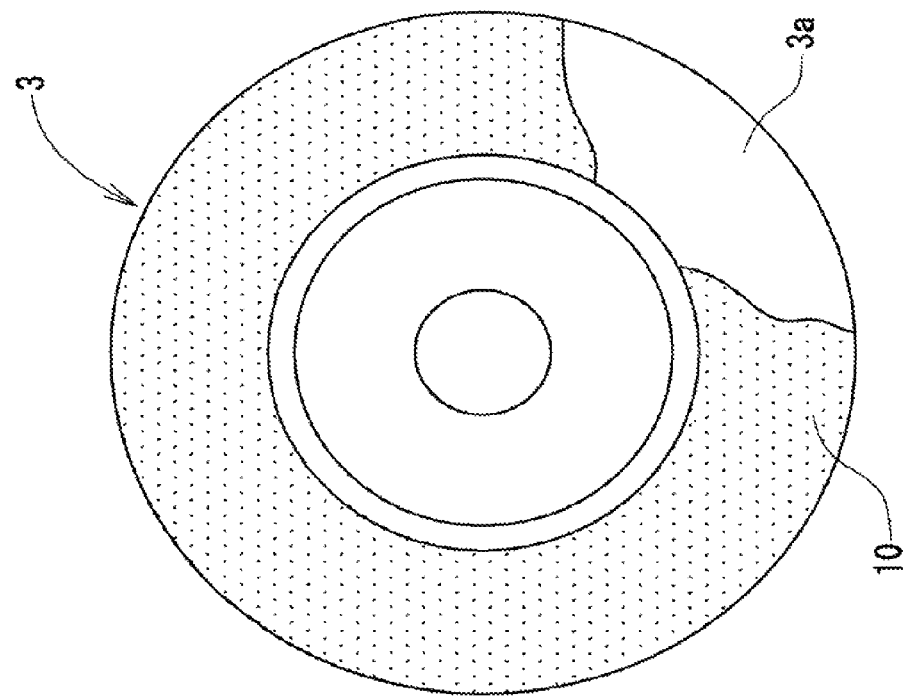

SWASH PLATE OF A SWASH PLATE TYPE COMPRESSOR AND THE SWASH PLATE TYPE COMPRESSOR

TECHNICAL FIELD

The present invention relates to a swash plate of a swash plate type compressor used e.g. in an air-conditioner, and the swash plate type compressor.

BACKGROUND ART

A swash plate type compressor includes a swash plate mounted directly to a rotary shaft or indirectly to the rotary shaft through a coupling member so as to be oblique to or perpendicular to the rotary shaft in a housing in which a refrigerant exists, the swash plate being in sliding contact with shoes such that the rotary motion of the swash plate is converted to reciprocating motion of pistons through the shoes, thereby compressing and expanding the refrigerant. There are two types of such swash plate type compressors, one including two-head pistons and adapted to compress and expand the refrigerant on both sides of the pistons, and one including single-head pistons and adapted to compress and expand the refrigerant on one side only of the pistons. The shoes of some swash plate type compressors slide only on one side of the swash plate, while the shoes of other swash plate type compressors slide on both sides of the swash plate.

In these swash plate type compressors, during the initial stage of operation, the swash plate and the shoes, which are both made of metal, may be brought into sliding contact with each other before lubricating oil reaches into the housing, in which the refrigerant exists. This could cause a dry lubricating state in which the sliding parts slide against each other with no lubricating oil therebetween, which in turn could cause seizure. With more recent swash plate type compressors in which carbon dioxide gas is used as a refrigerant, since the pressure in the compressor reaches as high as 10 MPa, the sliding pressure between the swash plate and the shoes increases even higher, thus further increasing the possibility of seizure at the sliding parts of the swash plate.

In order to prevent such seizure, it has been proposed to form a metal spray coating layer on each of the sliding surfaces of the metal swash plate on which the shoes slide by metal spraying of a copper type or aluminum type metallic material, and to form on the metal spray coating layer, lead type plating, tin type plating, lead-tin type plating, polytetrafluoroethylene (PTFE) type coating, molybdenum disulfide coating, or a coating of a mixture of molybdenum disulfide and graphite (see e.g. JP Patent Publication 8-199327A). It has also been proposed to form a lubricating film comprising a solid lubricant such as molybdenum disulfide or polytetrafluoroethylene, a transfer amount adjusting agent such as earthy graphite, and a binder such as polyamideimide on the sliding surfaces of the swash plate through a metal spray coating layer of aluminum (see e.g. JP Patent Publication 2002-089437A).

The purpose of forming a metal spray coating layer of a copper type or an aluminum type between the metal substrate of the swash plate and the resin lubricating coating film is to prevent peeling of the resin lubricating coating film even if the resin lubricating coating film seizes. By using a soft metal of a copper type or an aluminum type, it is possible to prevent the shoes and the metal substrate from directly coming into sliding contact with each other, thus preventing a fatal seizure accident, even if the resin lubricating coating film becomes worn.

But since the metal spray coating layer is costly and also tends to lower the flatness of the swash plate, it is also being considered to omit such a metal spray layer. For example, in order to prevent seizure, it is proposed to form sliding layers on the swash plate which comprise a solid lubricant containing polytetrafluoroethylene and hardened with polyamideimide resin, which is a thermosetting resin, and to form, on the shoes which are brought into sliding contact with the swash plate, nickel type plating, thereby further improving lubricity between the swash plate and the shoes (JP Patent Publication 2003-138287A).

If a coating film which is wear-resistant and of high strength is formed on the swash plate, such a coating film is poor in conformability, which increases sliding resistance, which tends to increase the possibility of peeling of the coating film. Thus, in order to improve the friction properties in fluid lubrication, boundary lubrication and dry lubrication states, it is proposed to a plurality of concentric circumferential grooves and ribs between the adjacent grooves (PCT Publication WO2002/075172).

As stated above, it is costly to form a metal spray coating layer of a copper type or aluminum type material on the surface of the substrate as an intermediate layer. Also, such a metal spray coating layer tends to lower the flatness of the swash plate.

SUMMARY OF THE INVENTION

An object of the present invention is to provide a swash plate which fulfils the basic properties required for a swash plate, which are stable boundary lubricating state by lubricating oil, and stable friction/wear properties in the boundary lubricating state with lubricating oil running out, without forming a metal spray coating layer comprising a copper type or aluminum type material on the surface of the substrate as an intermediate layer.

In order to achieve this object, the present invention provides a swash plate of a swash plate type compressor in which the swash plate is mounted directly to a rotary shaft or indirectly to the rotary shaft through a coupling member so as to be oblique to or perpendicular to the rotary shaft in a housing in which a refrigerant exists, the swash plate being in sliding contact with shoes such that the rotary motion of the swash plate is converted to reciprocating motion of pistons through the shoes, thereby compressing and expanding the refrigerant, wherein the swash plate comprises a substrate formed by pressing a rolled steel into a disk shape, the disk-shaped steel sheet having sliding surfaces on both sides thereof on which the shoes slide, the sliding surfaces being formed by grinding, the swash plate further comprising low-friction resin coating layers formed on the respective sliding surfaces, the coating layers containing 40 to 50% by weight of fluororesin.

That is, the substrate of the swash plate according to the present invention comprises a disk-shaped steel sheet formed by pressing a rolled steel sheet into a disk shape, and having its both side surfaces ground. Thus, its surface flatness is high, so that without forming a metal spray layer on the surface, the coating film forming the low-friction resin coating layers adheres strongly to the substrate, thus preventing peeling of the low-friction resin coating layers.

Since the flatness of the surface of the substrate of the swash plate is high, the low-friction resin coating layers maintain uniform thickness, which in turn achieves a stable boundary lubrication state by lubricating oil, as well as stable friction/wear properties in the boundary lubrication state with lubricating oil running out.

Both side surfaces of the disk-shaped steel sheet may be ground using a two-head grinding machine.

Both sides of the disk-shaped steel sheet may be ground by a driving type two-head grinding method in which top and bottom surfaces of the disk-shaped steel sheets as the sliding surfaces are simultaneously ground with grinders, while rotating the disk-shaped steel sheet with its center held in position.

Preferably, the ground surfaces of the disk-shaped steel sheet on both sides thereof are ground to a flatness of 8 μm or less and a parallelism of 10 μm or less.

As used herein, the flatness and the parallelism are values defined under JIS B 0182.

The surface of the substrate before the low-friction resin coating layers are formed thereon may be subjected to shot blasting.

The disk-shaped steel sheet may be made of SAPH440.

The low-friction resin coating composition forming the low-friction resin coating layers may be the one described below.

The low-friction resin coating composition contains 40 to 50% by weight of fluororesin relative to the coating film. Fluororesins usable in this invention are those capable of imparting low-friction, non-tackiness properties to the coating layers and having sufficient heat resistance to withstand the use temperature atmosphere of the sliding parts.

Specifically, the fluororesin may be polytetrafluoroethylene (melting point: 327° C.; continuous use temperature: 260° C.; hereinafter referred to as "PTFE"). PTFE consists of repeating units of —CF2CF2- and has a sufficiently high melt viscosity of $10^{10}$-$10^{11}$ Pa·s at about 340 to 380° C. Thus, it is less likely to flow even if it is heated to above the melting point, so that PTFE is the most heat-resistant fluororesin. It also shows excellent properties at low temperature, and is superior in friction/wear properties too. Thus, PTFE is suitable for use in the present invention. PTFE used should be powder and is preferably, but is not limited to, powder having a particle diameter of 30 μm or less for smoother surface of the coating film.

Matrix materials usable in the low-friction resin coating composition are heat-resistant resins that do not suffer from heat degradation during use of the swash plate and that can bind fluororesin powder particles together and can strongly fix the low-friction resin coating composition to the substrate of the swash plate.

Specifically, the matrix material may be a polyamideimide resin (PAI). PAI is a resin having imide bonds and amide bonds in its molecules. The imide bonds in an aromatic polyamideimide resin may be precursors such as polyamide acids, closed imide rings, or a mixture thereof.

Such aromatic PAIS include PAIS produced from aromatic primary amines such as diphenylmethane diamine and aromatic tribasic acid anhydrides such as mono- or diacyl halide derivatives of trimellitic acid anhydride, and PAIS produced from aromatic tribasic acid anhydrides and aromatic diisocyanate compounds such as diphenylmethane diisocyanate. PAIS of which the imide bonds are higher in ratio than the amide bonds include PAIS produced from aromatic, aliphatic or cycloaliphatic diisocyanate compounds, aromatic tetrabasic acid dianhydride, and aromatic tribasic anhydride. Any of them can be used in the present invention.

Preferably, the low-friction resin coating composition further contains graphite. It is well known that graphite has excellent properties as a solid lubricant, and it is used as a solid lubricant for swash plates.

There are two types of graphite, natural graphite and artificial graphite. Artificial graphite is not suitable as a lubricant because its lubricating properties tend to deteriorate due to carborundum produced during production of artificial graphite and thus sufficient graphitization is difficult. Some natural graphite is sufficiently graphitized, so that it has extremely high lubricating properties and is suitable as a solid lubricant. But natural graphite contains large amounts of impurities. Since impurities reduce lubricity, it is necessary to remove impurities. But it is difficult to completely remove impurities.

Preferably, the graphite in the low-friction resin coating composition is preferably one containing 97.5% or more of fixed carbon. Further preferably, the graphite is artificial graphite containing 98.5% or more of fixed carbon. Such graphite is preferable because it is high in conformability with lubricating oil, so that lubricity is maintained by a trace amount of lubricating oil impregnated in the graphite even if no lubricating oil is adhered to the surface of the graphite.

The low-friction resin coating composition comprises 40 to 50% by weight of fluororesin and 50 to 60% by weight of matrix material, relative to the coating film. By adding the respective components by these amounts, the bond strength to the substrate, wear resistance of the coating film, and other properties improve. If the content of fluororesin is less than 40% by weight, the friction properties tend to deteriorate. If over 50% by weight, the bond strength of the coating film decreases, thus increasing the possibility of peeling.

Further, in order to improve friction/wear properties, graphite is preferably added. In this case, the resin composition comprises 40 to 50% by weight of fluororesin, 45 to 55% by weight of matrix resin, and 1 to 10% by weight of graphite, relative to the coating film. If the content of graphite is less than 1% by weight, the graphite can scarcely serve the expected function of improving the friction/wear properties. If over 10% by weight, the bond strength of the coating film deteriorates, thus causing the possibility of peeling. If the content of the matrix material is less than 45% by weight, the bond strength of the coating film deteriorates, thus increasing the possibility of peeling. If its content is over 55% by weight, the friction properties deteriorate.

The coating film according to the present invention is applied by spray coating of the above-described low-friction resin coating composition. The low-friction resin coating composition is obtained by dispersing or dissolving solid contents, i.e. fluororesin, matrix resin and graphite in a solvent. Solvents usable include ketones such as acetone and methylethylketone, esters such as methyl acetate and ethyl acetate, aromatic hydrocarbons such as toluene and xylene, organic halogenated compounds such as methylchloroform, trichloroethylene and trichlorotrifluoroethane, and aprotic polar solvents such as N-methyl-2-pyrrolidone (NMP), methylisopyrrolidone (MIP), dimethylformaldehyde (DMAC) and a mixture thereof.

The coating film fixed to the substrate by applying the low-friction resin coating composition to the substrate by spray coating and then baking has a thickness of 20 to 50 μm after baking. By grinding the thus formed low-friction resin coating film to the thickness of 8-30 μm using the same two-head grinding method used to grind the substrate, it is possible to adjust the flatness of the final product to 10 μm or less and its parallelism to 10 μm or less.

The present invention also provides a swash plate type compressor including the above-described swash plate.

The swash plate type compressor is especially suitable for application to the type using carbon dioxide gas as a refrigerant.

Because the substrate of the swash plate used in the swash plate type compressor according to the present invention comprises a disk-shaped steel sheet formed by pressing a rolled steel sheet into a disk shape, and both surfaces of the disk-shaped steel sheet are ground, its surface flatness is good, and the coating film forming the low-friction resin coating layers can be strongly fixed to the substrate without the need to form a metal spray coating layer on the surface of the substrate. Thus, the low-friction resin coating layers are less likely to peel off.

Since the substrate of the swash plate has a good surface flatness, the low-friction resin coating layers can maintain uniform thickness, which ensures stable boundary lubricating condition by lubricating oil, and also ensures stable friction/wear properties in the boundary lubricating condition even if lubricating oil runs out.

Since the swash plate type compressor according to this invention includes the above-described swash plate, it shows sufficient durability even if carbon dioxide gas is used as a refrigerant, of which the pressure in the compressor reaches as high as 10 MPa.

BRIEF DESCRIPTION OF THE DRAWINGS

FIG. 2 is an enlarged vertical sectional view of the swash plate of FIG. 1.

FIG. 3 is a partially cutaway side view of the swash plate of FIG. 1.

DETAILED DESCRIPTION OF THE INVENTION

Figure 1:
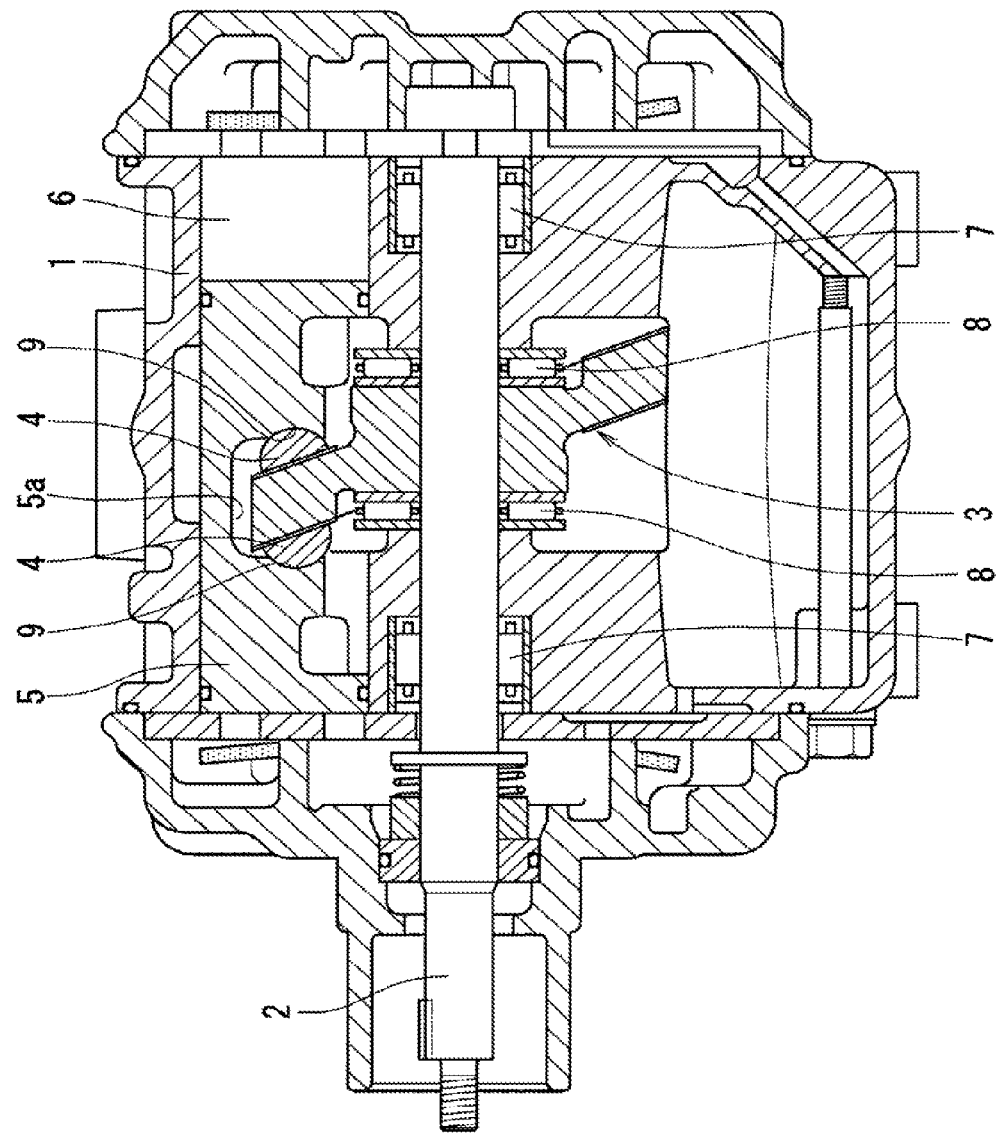
FIG. 1 is a vertical sectional view of a swash type compressor embodying the present invention.

Now the embodiment of the present invention is described with reference to the drawings. Carbon dioxide gas is used in this swash plate compressor as a refrigerant. As shown in FIG. 1, this compressor is a two-way swash plate compressor including a housing 1 in which the refrigerant exists, a swash plate 3 directly fixed to a rotary shaft 2 in the housing 1 so as to be oblique to the rotary shaft 2, and two-head pistons 5, and is structured to convert the rotary motion of the swash plate 3 to reciprocating motion of the respective two-head pistons 5 through shoes 4 that slide on both sides of the swash plate 3, thereby compressing and expanding the refrigerant in cylinder bores 6 that are equiangularly spaced from each other on both sides of the pistons 5, when the heads of the respective pistons 5 are inserted into and out of the corresponding cylinder bores 6. The rotary shaft 2, which is rotated at high speed, is supported by needle roller bearings 7 in the radial direction, and by thrust needle roller bearings 8 in the thrust direction.

Each piston 5 has a recess 5a that straddles the radially outer portion of the swash plate 3. The recess 5a has axially opposed surfaces in which spherical seats 9 are formed. The hemispherical shoes 4 are seated in the respective spherical seats 9. Instead of the hemispherical shoes 4, spherical shoes may be used. The shoes 4 support the respective pistons 5 so as to be movable relative to the swash plate 3 as the swash plate 3 rotates, thereby facilitating conversion of the rotary motion of the swash plate 3 to the reciprocating motion of the respective pistons 5.

As shown in FIG. 2, on the side surfaces of the substrate 3a of the swash plate 3 along which the shoes 4 slide, resin coating layers 10 comprising PTFE as a fluororesin, PAI as a heat-resistant resin, and graphite powder are formed.

The substrate 3a of the swash plate 3 is a disk-shaped steel sheet formed by pressing a rolled steel sheet. Both side surfaces of the disk-shaped steel sheet are ground into sliding surfaces along which the shoes slide. The low-friction resin coating layer 10, which contains 40 to 50% by weight of fluororesin, is formed on each sliding surface.

The resin coating layers 10 are formed on the surfaces of the substrate 3a by applying by spray-coating a coating agent formed by dissolving PAI in a solvent to form a resin solution and diluting the solution by adding PTFE and graphite powder, and then by baking the thus applied coating agent at 240° C. The content ratios of PAI and graphite powder are 150 parts by weight and 10 parts by weight based on 100 parts by weight of PTFE. PTFE used was an irradiated recycled PTFE, PAI was a PAI varnish dispersed with N-methylpyrrolidone, and graphite powder was an artificial graphite having an average particle diameter of 10 μm.

EXAMPLES

Examples of the Invention

In each example of the invention, the substrate 3a of the swash plate 3 was formed as follows: A steel sheet SAPH440 was formed into a disk shape by pressing, and roughly machined by a lathe to the thickness of 6.5 mm and a diameter of 90 mm. Both sides thereof were then ground using a two-head grinding machine (grinder: #80) so that the thickness of the substrate decreases to 6.36 mm. Table 1 shows the measured accuracy values after the respective steps.

The disk substrates thus formed were subjected to shot blasting to increase their surface roughness.

Then, a low-friction resin coating composition containing formula A as solid contents were applied by spray coating to both sides of the respective specimens thus formed so that their thicknesses are 30 μm on both sides after baking. After baking, final finish machining was carried out using a two-head grinding machine (grinder: #400 for resin) (to the thickness of 6.40 mm). Measured accuracy values after the finish machining are shown in Table 1.

Formula A
(a) PTFE: PTFE having an average particle diameter of 10 μm; 40% by weight
(b) PAI: having a glass transition temperature of 245° C.; 55% by weight
(c) Graphite powder: Artificial graphite having an average particle diameter of 10 μm; 5% by weight

Comparative Example

A steel sheet S45CAPH440 was formed into a disk shape by pressing, and roughly machined by a lathe to the thickness of 6.5 mm and a diameter of 90 mm. Both sides thereof were then ground using a surface grinding machine (grinder: #80) so that the thickness of the substrate decreases to 6.36 mm. Table 1 shows the measured accuracy values after the respective steps.

Formula A was applied by spray coating to both sides of the test piece so that the coating thickness is 30 μm after baking. After baking, final finish machining was carried out using a surface grinding machine (grinder: #400 for resin) (to the thickness of 6.40 mm). Measured accuracy values after the finish machining are shown in Table 1.

TABLE 1

|  | Example 1 of invention | Example 2 of invention | Comparative Example 1 |
|---|---|---|---|
| Rough machining of substrate | Cutting | Cutting | Cutting |
| Flatness, μm | 15 | 15 | 20 |
| Parallelism, μm | 20 | 20 | 30 |
| Finish machining of substrate | Driving type two-head grinding | Driving type two-head grinding | Carrier type two-head grinding |
| Flatness, μm | 3 | 10 | 20 |
| Parallelism, μm | 5 | 15 | 35 |
| Finishing of coating film | Driving type two-head grinding | Driving type two-head grinding | Carrier type two-head grinding |
| Flatness, μm | 3 | 3 | 14 |
| Parallelism, μm | 5 | 5 | 20 |
| Thickness of coating film | 20 | 20 |  |
| Variation | 3 | 12 | 20 |

For the accuracy of the substrate 3a after finish machining, the flatness was 8 μm or less and the parallelism was 10 μm or less for Example 1 of the invention. For Example 2 of the invention, the parallelism (maximum difference in thickness) was 15 μm. This increased the maximum difference in thickness of the coating film to 12 μm for Example 2 of the invention, while this difference was stably around 3 μm for Example 1 of the invention.

For accuracy after finish machining of the substrate in Comparative Example 1, the flatness was 20 μm and the parallelism was 35 μm. After final finishing after coating, there were portions where the substrate was exposed.

For the respective test pieces for Examples of the invention and the Comparative Example, a friction/wear test was conducted using a thrust type tester in which three steel shoes (SUJ2) are brought into contact with the respective test pieces (three-shoe-on type) to measure the friction coefficients at the sliding portions in the initial stage of the test and five minutes into the test, and the depths of wear on the sliding surfaces of the respective test pieces, five minutes into the test. The test conditions are as follows:

Sliding surface pressure: 10 MPa
Sliding speed: 210 m/min
Lubricating conditions: The sliding surfaces were wetted with PAG refrigerating machine oil.
Test time: Five minutes
Table 2 shows the results of the friction/wear test.

TABLE 2

|  | Example 1 of invention | Example 2 of invention | Comparative Example 1 |
|---|---|---|---|
| Initial friction coefficient | 0.02 | 0.02 | 0.02 |
| Frictional coefficient five minutes into the test | 0.04 | 0.04 | 0.08 |
| Depth of wear five minutes into the test | 0.002 | 0.002 | Peeling of resin layer |
| Determination of the test results | ◯ | ◯ | X |

For the Examples of the invention, the friction coefficient was stable from the beginning of the test to 5 minutes, and the depth of wear was extremely low. In contrast, for the Comparative Example, there were portions where the resin coating peeled off the substrate. Thus, it was discovered that the resin coating film containing fluororesin, which has superior seizure resistance, is less likely to peel off, so that the swash plate according to the present invention shows sufficiently high durability when used in a swash plate type compressor using carbon dioxide gas as a refrigerant of which the pressure in the compressor reaches as high as 10 MPa.

As described, the swash plate according to the present invention is formed by pressing a rolled steel sheet into a disk shape, grinding both side surfaces of the disk-shaped steel sheet formed by pressing using a two-head grinding machine, and forming a low-friction coating layer containing 40 to 50% by weight of fluororesin in the coating film on each sliding surface. This eliminates the necessity for flame spray coating layers, which were necessary in conventional arrangements.

Since the metal substrate and the low-friction resin coating composition can be formed with high accuracy, uneven wear does not occur, so that the metal substrate is never exposed even if refrigerant oil runs out.

By machining a metal substrate so that its flatness is 8 μm or less and its parallelism is 10 μm or less, applying a fluororesin type coating, and machining the thus applied fluororesin type coating film, it was possible to improve the final finishing accuracy to 10 μm or less in flatness and 10 μm or less in parallelism.

Thus, it was confirmed that the swash plate according to the present invention is economical and can effectively and stably achieve a boundary lubricating state even if refrigerating machine oil runs out during operation of the swash plate type compressor.

What is claimed is:

1. A method of manufacturing a swash plate for a swash plate type compressor in which the swash plate is mounted directly to a rotary shaft or indirectly to the rotary shaft through a coupling member so as to be oblique to or perpendicular to the rotary shaft in a housing in which a refrigerant exists, and in which the swash plate is in sliding contact with shoes such that the rotary motion of the swash plate is converted to reciprocating motion of pistons through the shoes, thereby compressing and expanding the refrigerant, the method comprising:
    forming a substrate of the swash plate by pressing a rolled steel into a disk-shaped steel sheet;
    forming sliding surfaces on both sides of the disk-shaped steel sheet by
        firstly grinding side surfaces of the disk-shaped steel sheet to a flatness of 10 μm or less and a parallelism of 15 μm or less, and
        subjecting the side surfaces to shot blasting;
    forming low-friction resin coating layers on the sliding surfaces, respectively, without forming an intermediate metal coating layer between the substrate and the respective low-friction coating layers, by applying a coating material containing fluororesin, matrix resin, and graphite on the side surfaces of the disk-shaped steel sheet by spray coating and baking the thus applied coating material; and
    secondly grinding the low-friction resin coating layers formed on the sliding surfaces of the disk-shaped steel sheet,
    wherein the low-friction resin coating layers each have a thickness within a range of 8 to 30 μm,
    wherein the fluororesin is polytetrafluoroethylene resin and constitutes 40-50% of each of the low-friction coating layers,
    wherein the graphite is in the form of powder having a particle diameter of 30 μm or less, wherein the matrix resin is polyamideimide resin,
wherein both side surfaces of the disk-shaped steel sheet are ground using a two-head grinding machine, and
wherein the side surfaces of the disk-shaped steel sheet are top side and bottom side surfaces, and wherein the firstly grinding and the secondly grinding are both performed by a driving type two-head grinding method in which the top side and bottom side surfaces of the disk-shaped steel sheet are simultaneously ground with grinders while rotating the disk-shaped steel sheet with its center held in position.

2. The method of manufacturing a swash plate according to claim 1, wherein the ground surfaces of the disk-shaped steel sheet on both sides thereof are ground to a flatness of 8 μm and a parallelism of 10 μm or less.

3. The method of manufacturing a swash plate according to claim 1, wherein the disk-shaped steel sheet is made of SAPH440.

4. The method of manufacturing a swash plate according to claim 1, wherein the graphite is graphite containing 97.5% or more of fixed carbon.

5. The method of manufacturing a swash plate according to claim 4, wherein the graphite is artificial graphite containing 98.5% or more of fixed carbon.

* * * * *